(12) United States Patent
Deane, III et al.

(10) Patent No.: US 6,969,828 B2
(45) Date of Patent: Nov. 29, 2005

(54) ICE SCRAPER

(76) Inventors: William J Deane, III, 903 Haines Ave., Wilmington, DE (US) 19809; Briana L. Deane, 903 Haines Ave., Wilmington, DE (US) 19809; Brittany L. Deane, 903 Haines Ave., Wilmington, DE (US) 19809

( * ) Notice: Subject to any disclaimer, the term of this patent is extended or adjusted under 35 U.S.C. 154(b) by 0 days.

(21) Appl. No.: 10/665,037

(22) Filed: Sep. 22, 2003

(65) Prior Publication Data

US 2005/0061793 A1 Mar. 24, 2005

(51) Int. Cl.$^7$ .............................................. H05B 1/00
(52) U.S. Cl. .................. 219/229; 219/228; 219/230; 219/227; 222/182
(58) Field of Search ................. 219/228, 229, 219/227, 230; 15/111, 401; 222/182, 190, 222/191, 402.1; 401/1, 2, 27, 25, 139, 37

(56) References Cited

U.S. PATENT DOCUMENTS

| | | | |
|---|---|---|---|
| 2,700,096 A | | 1/1955 | Clements |
| 2,832,980 A | * | 5/1958 | O'Neill ........................ 401/27 |
| 3,185,351 A | * | 5/1965 | Klun .......................... 222/182 |
| 3,253,786 A | * | 5/1966 | Parmelee ................ 239/284.1 |
| 3,754,831 A | * | 8/1973 | Hutter ........................ 401/139 |
| 3,898,429 A | | 8/1975 | Chodak |
| 4,275,476 A | | 6/1981 | Hopkins et al. |
| D273,049 S | | 3/1984 | Lam et al. |
| 5,189,756 A | | 3/1993 | Sprunger |
| 5,287,593 A | | 2/1994 | Sprunger |
| 5,333,342 A | | 8/1994 | Huang |
| 5,357,646 A | * | 10/1994 | Kim ............................. 15/111 |
| 5,811,766 A | | 9/1998 | Fabrikant et al. |
| 5,827,055 A | * | 10/1998 | Rice .......................... 431/255 |
| 5,908,255 A | | 6/1999 | Branch |
| 5,973,294 A | * | 10/1999 | Schatt et al. ............... 219/228 |
| 6,044,563 A | | 4/2000 | Stallman |
| 6,283,656 B1 | | 9/2001 | Jiang |

FOREIGN PATENT DOCUMENTS

DE 3639531 12/1988

* cited by examiner

Primary Examiner—Cheryl Tyler
Assistant Examiner—Leonid M. Fastovsky
(74) Attorney, Agent, or Firm—Paul F. Daebeler

(57) ABSTRACT

An ice scraper including an elongated, hollow body portion, having a first end and a second end, and capable of receiving a lock de-icer container within the hollow body portion at the first end, wherein the lock de-icer container includes means for dispensing de-icer; and a blade member having an outer periphery and a forward edge, with a scraper blade formed in said forward edge for scraping ice from a surface, said blade member mounted to said hollow body portion at the second end.

19 Claims, 10 Drawing Sheets

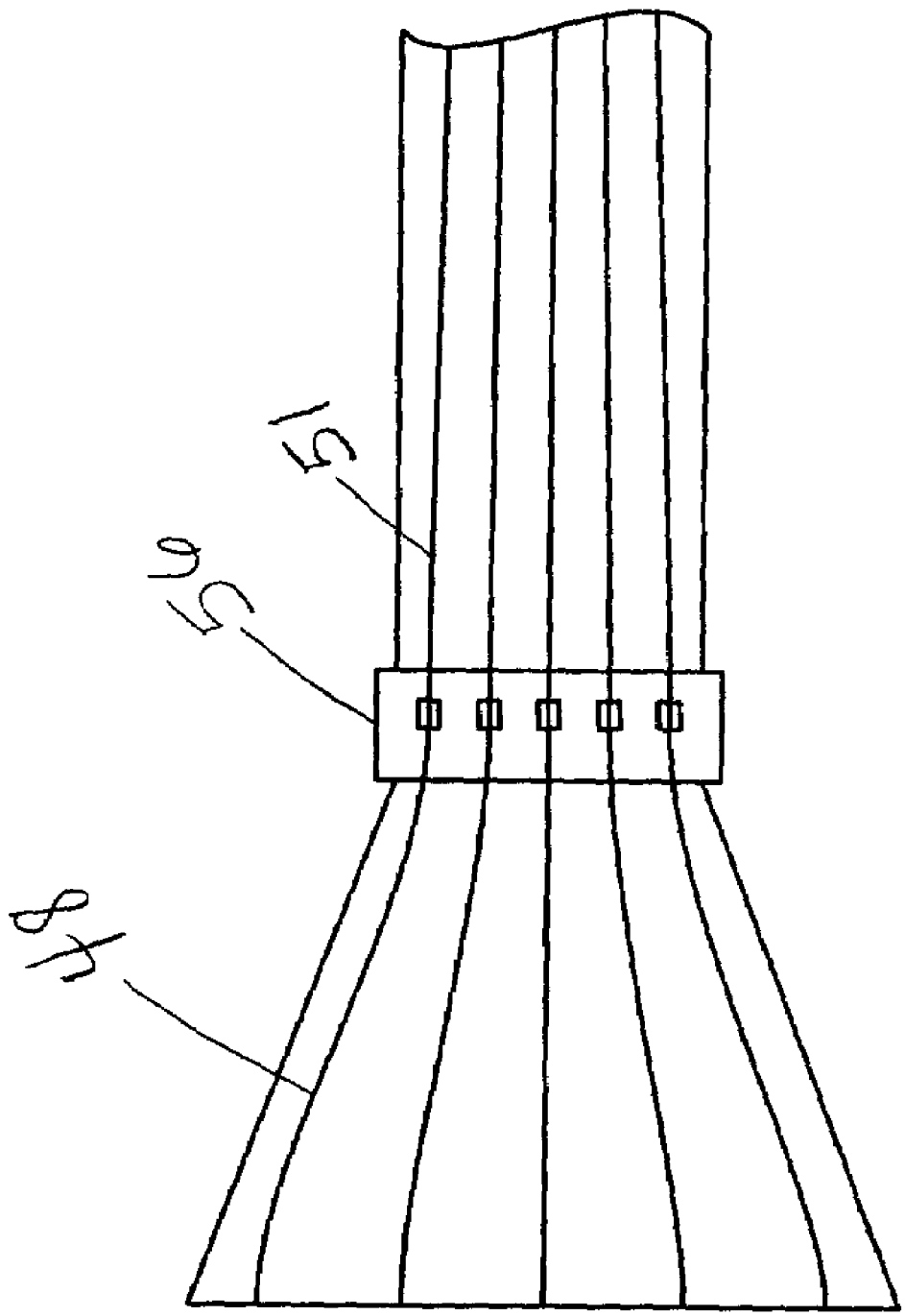

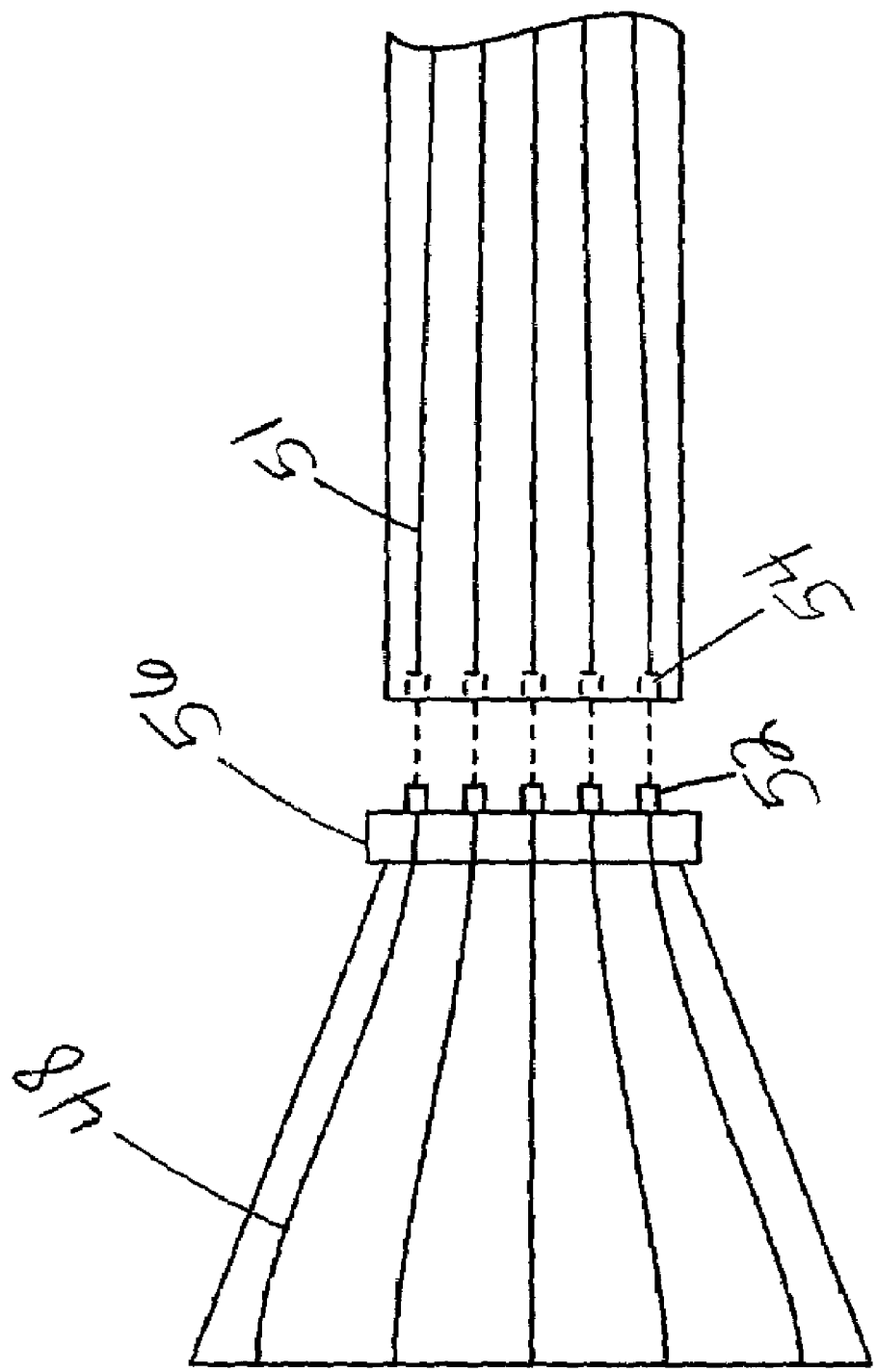

ICE SCRAPER

BACKGROUND OF THE INVENTION

1. Field of the Invention

This invention relates to a multipurpose ice scraper for removing ice and snow from a surface such as a windshield and for de-icing locks and surfaces.

2. Description of the Related Art

The use of ice scrapers such as heated blade ice scrapers is known in the prior art. Examples of heated blade ice scrapers are shown in U.S. Pat. No. 5,287,593, U.S. Pat. No. 5,357,646, and U.S. Pat. No. 5,973,294, which are incorporated by reference. Although ice scrapers for removing ice from an automobile windshield are known in the art, there is a need for a hand held multipurpose ice scraper, which can remove ice and snow from a surface and from a lock, such as a door lock. There is a need for a multipurpose ice scraper which can remove ice and snow from the surface of the lock as well as inside the lock. In addition, there is a need for a hand held multipurpose ice scraper capable of receiving removable containers of de-icer and dispensing de-icer to a lock and a surface such as a windshield. Additionally, there is need for heating blade of the multipurpose ice scraper and any containers within the multipurpose ice scraper, wherein heating of the containers causes heating of the handle.

Therefore, there is a longstanding need for a new and improved multipurpose ice scraper capable of removing ice from a surface such as a windshield and from a lock such as a door lock.

SUMMARY OF THE INVENTION

In one embodiment, an ice scraper comprises an elongated, hollow body portion, having a first end and a second end, and capable of receiving a lock de-icer container within the hollow body portion at the first end, wherein the lock de-icer container includes means for dispensing de-icer; and a blade member having an outer periphery and a forward edge, with a scraper blade formed in said forward edge for scraping ice from a surface, said blade member mounted to said hollow body portion at the second end.

In an alternative embodiment, an ice scraper comprises: a lock de-icer container containing de-icer; an elongated, hollow body portion having a first end and a second end, and capable of receiving the lock de-icer container within the hollow body portion at the first end, wherein the lock de-icer container includes means for dispensing de-icer; and a blade member having an outer periphery and a forward edge, with a scraper blade formed in said forward edge for scraping ice from a surface, said blade member mounted to said hollow body portion at a second end.

The ice scraper may further comprise a temperature controller; a switch; and a heating unit including a power source activated by the switch, and abutting the lock de-icer container, wherein the heating unit is regulated by the temperature controller. The ice scraper may have a rechargeable power source or a battery. The ice scraper may further comprise a transformer mounted in the hollow body portion; and at least one wire embedded in the blade member and scraper blade, wherein the transformer is operatively connected to said at least one wire, and said at least one wire being operable to generate heat upon energizing thereof by the switch and transformer for melting ice in contact with the blade member. The lock de-icer may contain a de-icing aerosol or de-icing liquid. The hollow body portion of the ice scraper may be tubular.

In an alternative embodiment, an ice scraper comprises a de-icer container containing a de-icer; an elongated, hollow body portion receiving the de-icer container therewithin, said body portion having a first end and a second end, wherein the de-icer container is received at the first end, wherein the de-icer container includes means for dispensing de-icer; a blade member having an outer periphery and a forward edge, with a scraper blade formed in said forward edge for scraping ice from a surface, said blade member mounted to said body portion at the second end; and a cap member engaged to said first end.

The cap member may be disengaged from the first end to remove said de-icer container from within said hollow body portion. Threads may circumscribe the first end of said hollow body portion, and the cap member is a threaded cap member, which is threadably engaged to said threads circumscribing the first end of said body portion.

In an alternative embodiment, an ice scraper comprises a de-icer container containing a valve for dispensing de-icer; a valve depresser having grippers; an elongated, hollow body portion receiving the de-icer container therewithin, said body portion having a first end and a second end, wherein: the de-icer container is received at the first end, and the first end has apertures for receiving the grippers of the valve depresser; a blade member having an outer periphery and a forward edge, with a scraper blade formed in said forward edge for scraping ice from a surface, said blade member mounted to said body portion at the second end; and a cap member engaged to said first end. The cap member may have a cap aperture, and the valve depresser may engage the valve of the de-icer container to dispense the de-icer through the cap aperture.

In an alternative embodiment, an ice scraper comprises a window de-icer container containing a valve for dispensing de-icer; a lock de-icer container containing a valve for dispensing de-icer; a first valve depresser having first grippers; a second valve depresser having second grippers; an elongated, hollow body portion having a first end and a second end, wherein: the hollow body portion receives the lock de-icer container therewithin at the first end, the hollow body portion receives the window de-icer container therewithin at the second end, wherein: the first end has first apertures for receiving the first grippers of the first valve depresser; and the second end has second apertures for receiving the second grippers of the second valve depresser; a blade member having an outer periphery and a forward edge, with a scraper blade formed in said forward edge for scraping ice from a surface, said blade member mounted to said body portion at the second end; and a cap member engaged to said first end. The ice scraper may have a cap member having a cap aperture, and the first valve depresser engages the valve of the lock de-icer container to dispense the de-icer through the cap aperture by actuating the first grippers. The blade member may have a blade conduit, and the second valve depresser engages the second valve of the window de-icer container to dispense the de-icer through the blade conduit by actuating the second grippers.

In an alternative embodiment, an ice scraper comprises a lock de-icer container containing de-icer, a window de-icer container containing de-icer; an elongated, hollow body portion having a first end and a second end, wherein: the hollow body portion receives the lock de-icer container therewithin at the first end, the hollow body portion receives the window de-icer container therewithin at the second end, wherein: the lock de-icer container includes means for dispensing de-icer and the second end has second apertures for receiving the second grippers of the second valve depresser; a cap member engaged to said first end; and a blade member having an outer periphery and a forward edge, with a scraper blade formed in said forward edge for scraping ice from a surface, said blade member mounted to said hollow body portion at a second end and having means for dispensing the de-icer through the blade member.

The ice scraper may further comprise a first temperature controller; a second temperature controller; a switch; a power source; a first heating unit energized by the power source when activated by the switch, and abutting the lock de-icer container; a second heating unit energized by the power source when activated by the switch, and abutting the window de-icer container. The power source may be rechargeable or may be a battery.

The ice scraper may further comprise a transformer mounted in the hollow body portion; and at least one wire embedded in the blade member and scraper blade, wherein the transformer is operatively connected to said at least one wire, and said at least one wire being operable to generate heat upon energizing thereof by the switch and transformer for melting ice in contact with the blade member. The at least one wire in the blade member may operatively connect to the transformer by interconnecting a male connector to a female connector. The blade member may have passageways therethrough to channel de-icer from the window de-icer container.

The ice scraper may further comprise wires embedded on either side of the passageways. The blade member may be removable. The blade member may be secured to the elongated hollow body portion by press fit. The blade member may be further secured to the elongated hollow body portion by a securing clamp. Threads may circumscribe the second end of said hollow body portion and the blade member has threads circumscribed thereon, which is threadably engaged to the threads circumscribing the second end of the body portion. The blade member may further secure to the elongated hollow body by a securing clamp.

These and other features and advantages of this invention are described in, or are apparent from, the following detailed description of various exemplary embodiments of the systems and methods according to this invention.

BRIEF DESCRIPTION OF THE DRAWINGS

Various embodiments of this invention will be described in detail, with reference to the following Figures, wherein:

FIGS. 6B–6C show an exemplary embodiment of male connectors, female connectors and a clamp connecting wires of a blade member with wires of a hollow body member according to some of the embodiments of the present invention; and FIGS. 6D-1 through 6D-3 show another exemplary embodiment of male connectors, female connectors and a clamp connecting wires of a blade member with wires of a hollow body portion according to some of the embodiments of the present invention.

DETAILED DESCRIPTION OF THE PREFERRED EMBODIMENTS

Figure 1A:
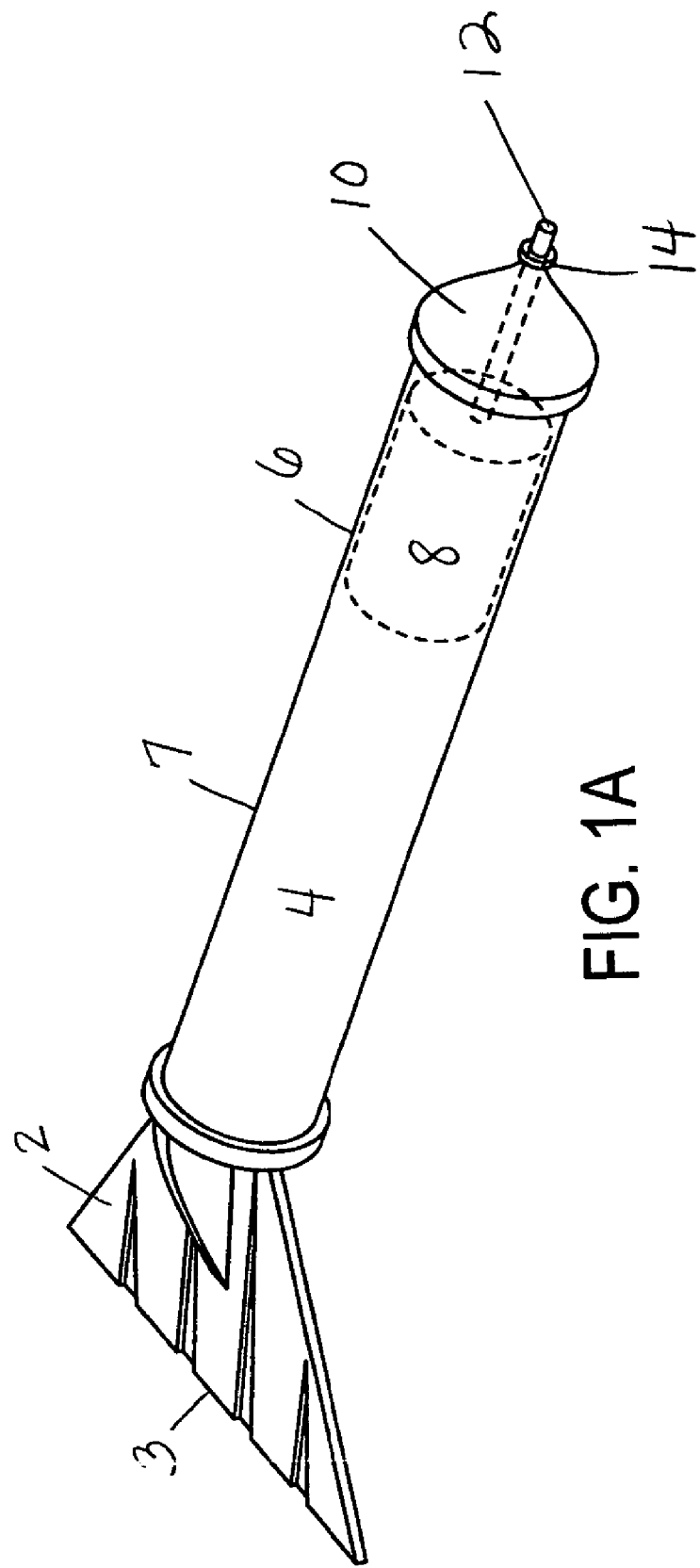
FIG. 1A is one exemplary embodiment of an ice scraper of the present invention.

FIG. 1A shows one exemplary embodiment of an ice scraper of the present invention. The ice scraper includes a blade member 2 having a scraper blade. The blade member 2 is mounted (connected) to an elongated hollow body portion 4. The elongated hollow body portion 4 is preferably tubular. The elongated hollow body portion 4 has a first end 6 and a second end 7. The elongated hollow body portion 4 contains a lock de-icer container 8 in the first end 6. The lock de-icer container 8 contains a de-icer such as a de-icing liquid, de-icing aerosol or the like. A cap member 10 includes an elongated valve 12 containing a stop 14. The cap member 10 is connected to the elongated hollow body portion 4. The elongated valve 12 of the cap member 10 dispenses a de-icer when force is applied to the stop 14. The de-icer is preferably applied to a lock such as a door lock to unfreeze a frozen lock.

Figure 1B:
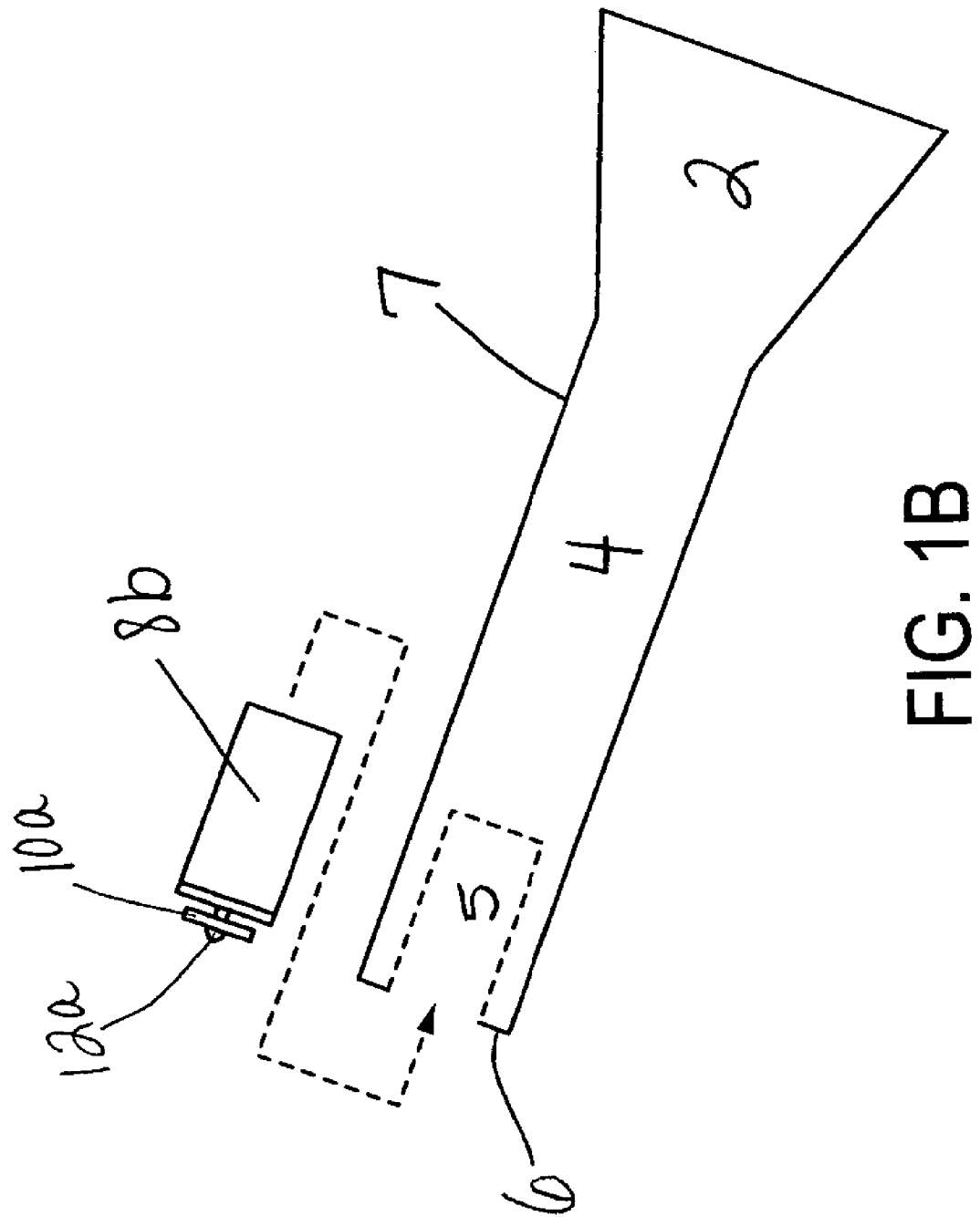
FIG. 1B is another exemplary embodiment of an ice scraper of the present invention.

FIG. 1B shows another exemplary embodiment of an ice scraper of the present invention. The ice scraper includes a blade member 2 having a scraper blade. The blade member 2 is mounted (connected) to an elongated hollow body portion 4. The elongated hollow body portion 4 is preferably tubular. The elongated hollow body portion 4 has a first end 6 having an opening 5 and a second end 7. The elongated hollow body portion 4 is capable of receiving a lock de-icer container 8b through opening 5 in the first end 6. The lock de-icer container 8b is capable of being removed. For example, once the lock de-icer container 8b is empty, the lock de-icer container 8b can be removed and another lock de-icer container 8b can be substituted therefore. The lock de-icer container 8b includes a cap 10a having a stop (not shown) and a valve 12a.

Figure 2:
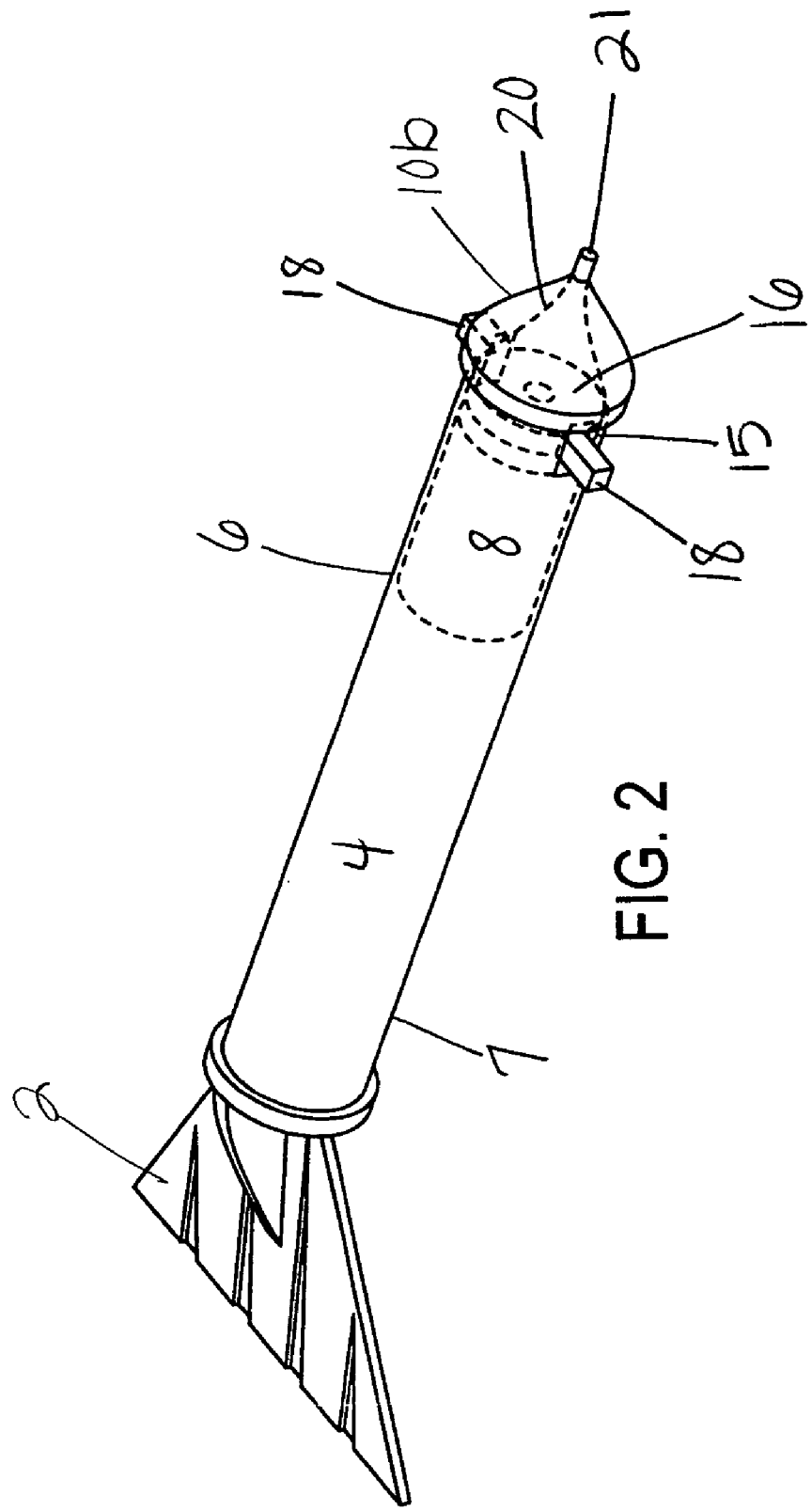
FIG. 2 is another exemplary embodiment of an ice scraper of the present invention.

FIG. 2 shows another exemplary embodiment of an ice scraper of the present invention. The ice scraper includes a blade member 2 having a scraper blade. The blade member 2 is mounted (connected) to an elongated hollow body portion 4. The elongated hollow body portion 4 is preferably tubular. The elongated hollow body portion 4 has a first end 6 and a second end 7. The elongated hollow body portion 4 is capable of receiving a lock de-icer container 8 through the first end 6. The lock de-icer container 8 can be unremovable or removable through the first end 6. For example, once the de-icer container 8 is empty, the de-icer container 8 can be removed and another de-icer container 8 can be substituted therefore. Alternatively, if the de-icer container 8 is not removable, a user can purchase a new multipurpose ice scraper having the de-icer container 8.

The first end 6 of the elongated hollow body portion 4 has apertures 15 for receiving depresser 16. The depresser 16 has grippers 18, which protrude through apertures 15. The cap member 10b is connected to the elongated hollow body portion 4 at the first end 6. The cap member 10b has a convergent section 20 and a cap aperture 21. The cap member 10b dispenses a de-icer through the convergent section 20 and out the cap aperture 21 when force is applied to the valve depresser 16 by way of grippers 18.

Figure 3:
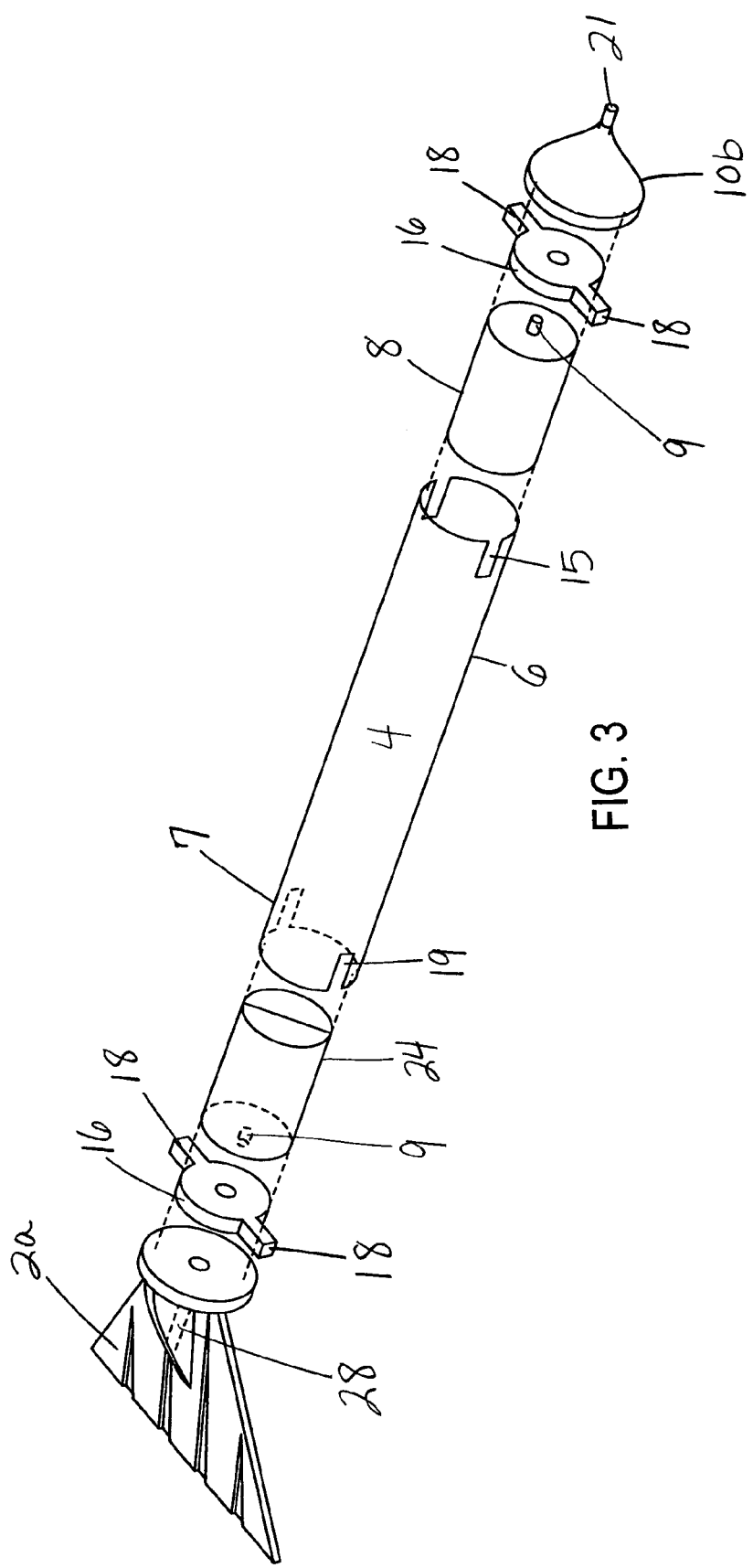
FIG. 3 is another exemplary embodiment of an ice scraper of the present invention.

FIG. 3 shows another exemplary embodiment of an ice scraper of the present invention. The ice scraper includes a blade member 2a having a scraper blade. The blade member 2a is mounted (connected) to an elongated hollow body portion 4. The elongated hollow body portion 4 is preferably tubular. The elongated hollow body portion 4 has a first end 6 and a second end 7. The elongated hollow body portion 4 is capable of receiving a lock de-icer container 8 through the first end 6. The lock de-icer container 8 can be unremovable or removable through the first end 6. For example, once the de-icer container 8 is empty, the de-icer container 8 can be removed and another de-icer container 8 can be substituted therefore. Alternatively, if the de-icer container 8 is not removable, a user can purchase a new multipurpose ice scraper having the de-icer container 8.

The first end 6 of the elongated hollow body portion 4 has apertures 15 for receiving depresser 16. The depresser 16 has grippers 18, which protrude through apertures 15. The cap member 10b is connected to the elongated hollow body portion 4 at the first end 6. The cap member 10b has a convergent section 20 (not shown) and a cap aperture 21. The cap member 10b dispenses a de-icer through the convergent section 20 (not shown) and out the cap aperture 21 when force is applied to the valve depresser 16 by way of grippers 18.

The elongated hollow body portion 4 is also capable of receiving a window de-icer container 24 through the second end 7. The window de-icer container 24 can be unremovable or removable through the second end 7. Preferably, the window de-icer container 24 can be removed through the second end 7 as shown in FIG. 3. For example, once the window de-icer container 24 is empty, the window de-icer container 24 can be removed and another window de-icer container 24 can be substituted therefore. Alternatively, if the window de-icer container 24 is not removable (not shown), a user can purchase a new multipurpose ice scraper having the window de-icer container 24 and the lock de-icer container 8.

The second end 7 of the elongated hollow body portion 4 has apertures 19 for receiving a second depresser 16. The depresser 16 has grippers 18, which protrude through apertures 19. The blade member 2a is connected to the elongated hollow body portion 4 at the second end 7. The blade member 2a has a passageway or blade conduit 28. The blade member 2a dispenses a de-icer through the conduit 28 when force is applied to the valve depresser 16 at the second end 7 by way of grippers 18.

Figure 4:
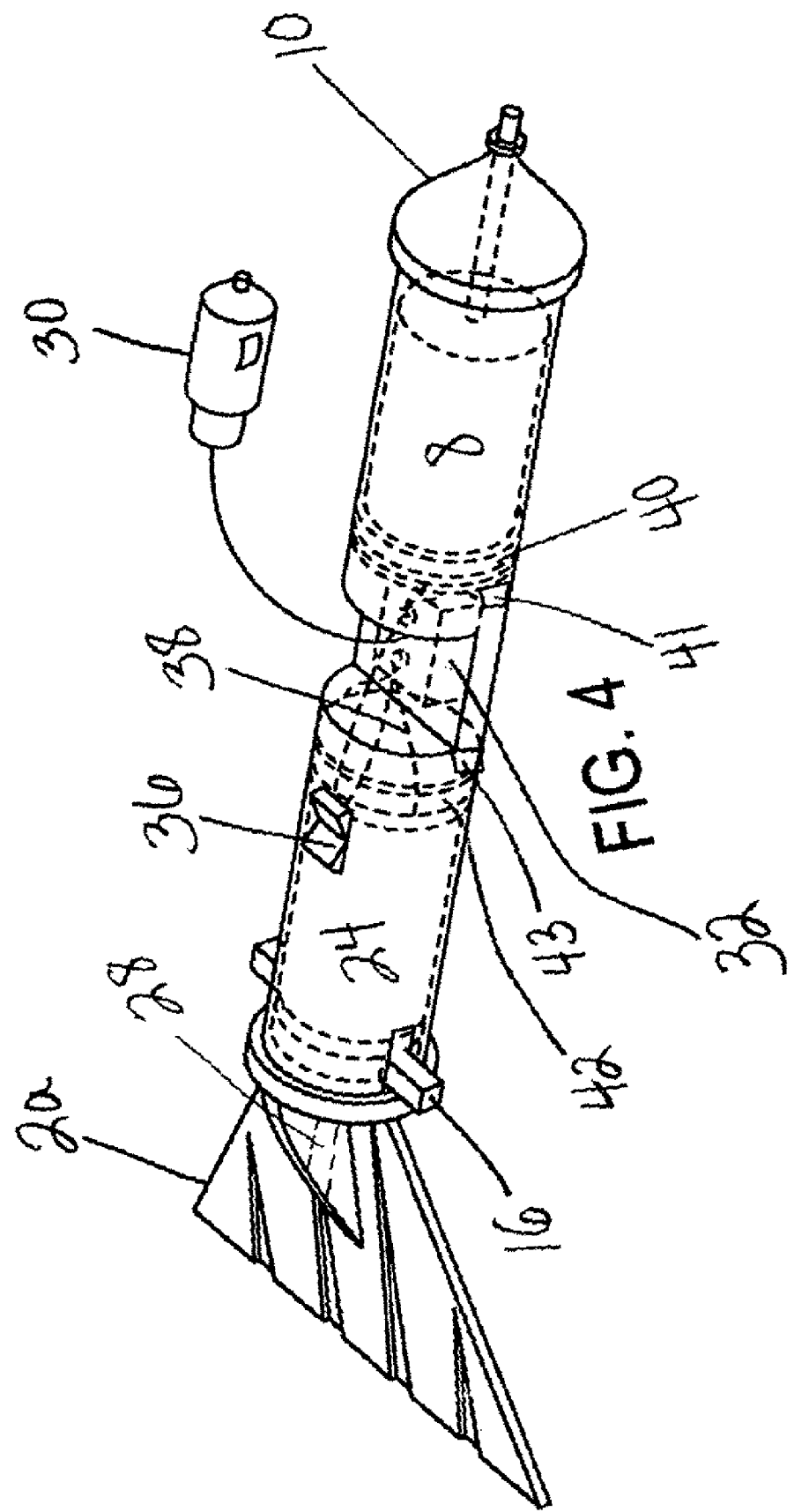
FIG. 4 is another exemplary embodiment of an ice scraper of the present invention.

FIG. 4 shows another exemplary embodiment of an ice scraper of the present invention. In FIG. 4, the ice scraper includes a cap member 10 connected to the first end 6 as previously described in FIG. 1 and a blade member 2a connected to the second end 7 as previously described in FIG. 3. Alternatively, the ice scraper can include a cap member 10b as previously described and shown in FIG. 2. In another alternative, the ice scraper can include an opening 5 in the first end 6 of the elongated hollow body portion 4, which is capable of receiving a lock de-icer container 8b as previously shown and described in FIG. 1B.

The elongated hollow body portion 4 includes heating units 40 and 42. The heating units include a power source 32, which may be a rechargeable battery connected to an adaptor 30. The adapter 30 can be adapter for a cigarette lighter or can be configured to plug into a wall socket. The power source 32 could also be a non rechargeable battery. Alternatively, the heating units 40 and 42 could have separate power sources such as a battery for each heating unit 40 and 42. The elongated hollow body portion 4 preferably has heating unit wires 38, which may be partially embedded in the elongated hollow body portion 4 or partially mounted to the inner walls of the elongated hollow body portion 4. The heating unit wires 38 connect the heating units 40 and 42 to a switch 36 mounted to the elongated hollow body portion 4. Temperature controllers 41 and 43 regulate the heating units 40 and 42 to prevent the lock de-icer container 8 or 8b and the window de-icer container 24 from over heating. An example of a heating unit is shown in U.S. Pat. No. 5,811,766, which is incorporated by reference. An example of a heating controller could be a thermostat also shown in U.S. Pat. No. 5,811,766, which as stated above is incorporated by reference.

Figure 5:
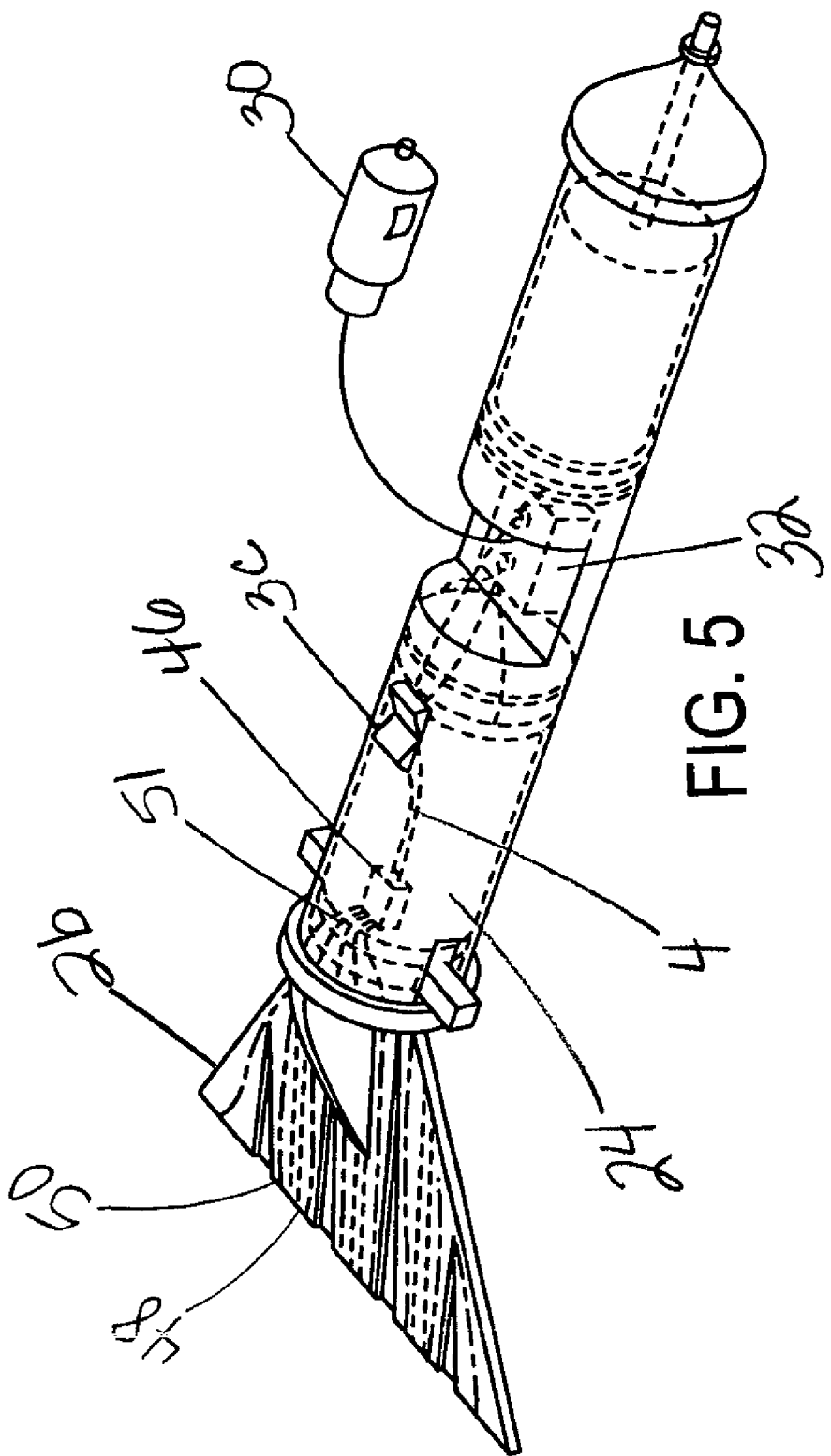
FIG. 5 is another exemplary embodiment of an ice scraper of the present invention.

FIG. 5 shows another exemplary embodiment of an ice scraper of the present invention. In addition to the structures shown and described in the exemplary embodiment of FIG. 4, the ice scraper shown in FIG. 5 further includes wires 44 connected to transformer 46 and to switch 36. In addition, a blade member 2b is substituted for the blade member 2a in the ice scraper shown in FIG. 5. The blade member 2b includes embedded wires 48 and blade conduits 50. The blade conduits 50 are capable of receiving the window de-icer from the window de-icer container 24. Wires 51 from the transformer are connected to the embedded wires 48. The transformer 46 regulates the heat of embedded wires 48.

Figure 6A:
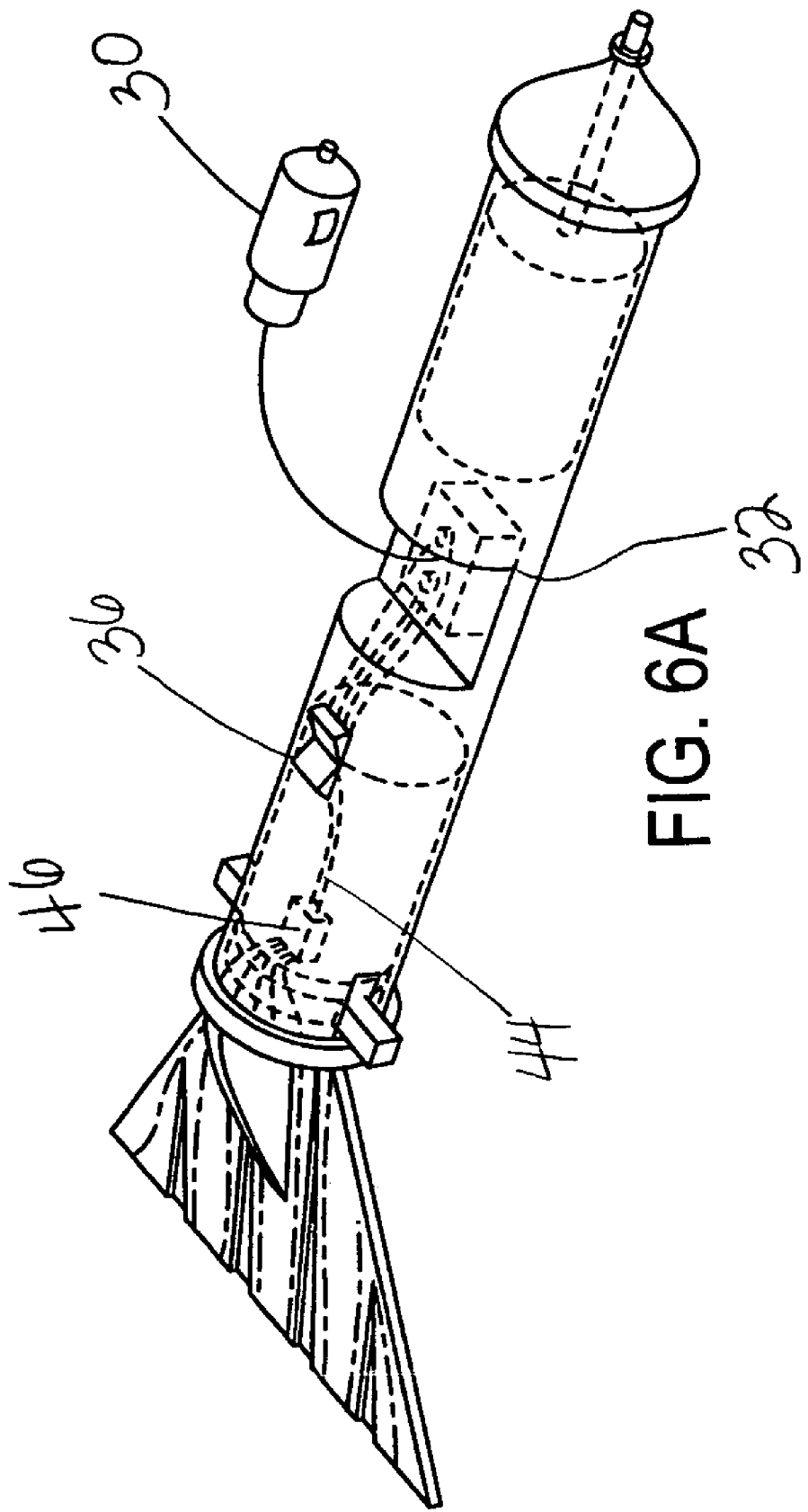
FIG. 6A is another exemplary embodiment of an ice scraper of the present invention.

FIG. 6A shows another exemplary embodiment of an ice scraper of the present invention. In the ice scraper shown in FIG. 6A, the heating units 40 and 42 are not incorporated. The power source 32 is connected to switch 36, which is connected to transformer 46. The transformer 46 is connected to wires 51, which are connected to embedded wires 48. The transformer 46 regulates the heat output to the blade member by the embedded wires. The blade member in FIG. 6A can be blade member 2a with embedded wires or blade member 2b.

FIGS. 6B–6C show an exemplary embodiment of male connectors 52, female connectors 54 and a clamp 56 connecting wires of a blade member with wires of a hollow body member according to some of the embodiments of the present invention. FIGS. 6B–6C show an exemplary embodiment of a press fit connection between male connectors 52 and female connectors 54. Although FIGS. 6B–6C show the male connectors as part of the blade member and female connectors as part of the elongated hollow body portion 4, the male connectors 54 could be part of the elongated hollow body portion 4 and the female connectors could be part of the blade member. The blade member and elongated hollow body portion 4 can be further secured by clamp 56.

Figures 2, 6D:
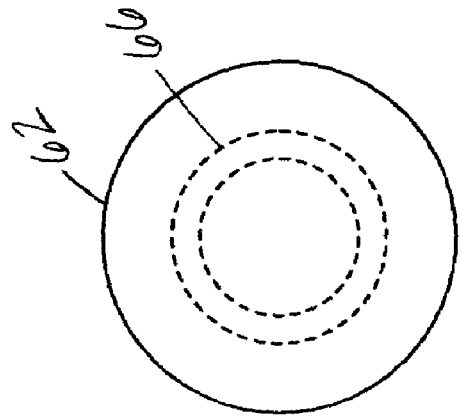
Figures 1, 6D:
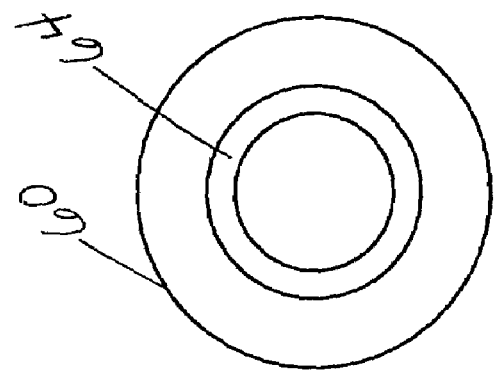
Figures 3, 6D:
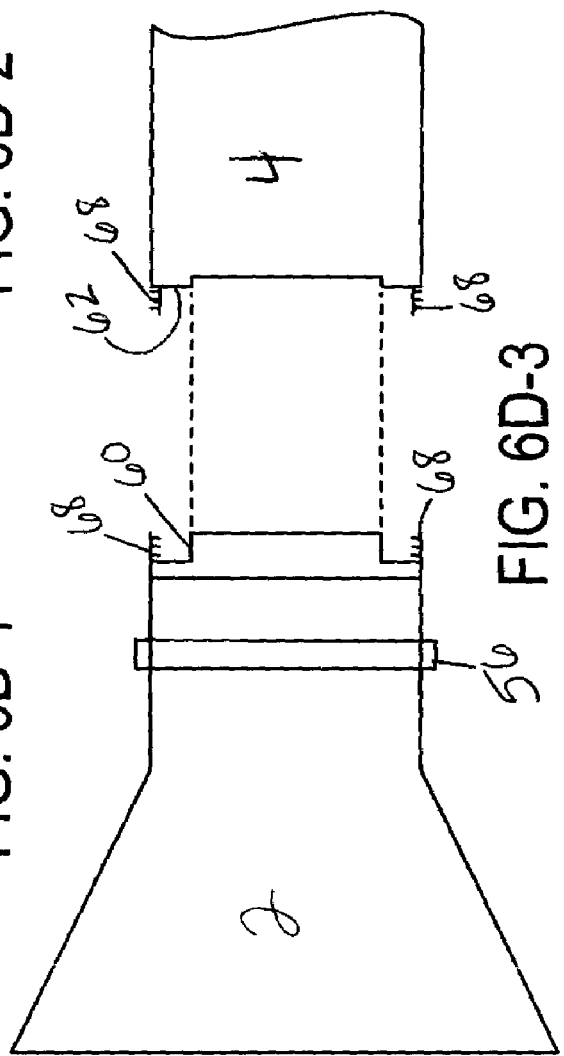

FIGS. 6D-1 through 6D-3 show another exemplary embodiment of male connector 60, female connector 62 and a clamp 56 connecting wires of a blade member with wires of the elongated hollow body portion 4 according to some of the embodiments of the present invention. FIGS. 6D-1 through 6D-3 show an exemplary embodiment of a threaded connection between male connector 60 and female connector 62. The threads are denoted by reference numeral 68. Alternatively, the male connector 60 and female connector 62 can be press fit. Whether press fit or threaded connection is used, clamp 56 can further secure the connection between the blade member and elongated hollow body portion 4.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention as set forth above, are intended to be illustrative, not limiting. Various changes may be made without departing from the spirit and scope of the invention. Therefore, the claims as filed and as they may be amended are intended to embrace all known or laterdeveloped alternatives, modifications, variations, improvements, and/or substantial equivalents.

What is claimed is:

1. An ice scraper, comprising:
   a window de-icer container containing a valve for dispensing de-icer;
   a lock de-icer container containing a valve for dispensing de-icer;
   a first valve depresser having first grippers;
   a second valve depresser having second grippers;
   an elongated, hollow body portion having a first end and a second end, wherein:
   the hollow body portion receives the lock de-icer container therewithin at the first end,
   the hollow body portion receives the window de-icer container therewithin at the second end, wherein:
   the first end has first apertures for receiving the first grippers of the first valve depresser; and
   the second end has second apertures for receiving the second grippers of the second valve depresser;
   a blade member having an outer periphery and a forward edge, with a scraper blade formed in said forward edge for scraping ice from a surface, said blade member mounted to said body portion at the second end; and
   a cap member engaged to said first end.

2. The ice scraper as in claim 1, wherein:
   the cap member has a cap aperture, and
   the first valve depresser engages the valve of the lock de-icer container to dispense the de-icer through the cap aperture by actuating the first grippers.

3. The ice scraper as in claim 1, wherein:
   the blade member has a blade conduit, and
   the second valve depresser engages the second valve of the window de-icer container to dispense the de-icer through the blade conduit by actuating the second grippers.

4. An ice scraper, comprising:
   a lock de-icer container containing de-icer;
   a window de-icer container containing de-icer;
   an elongated, hollow body portion having a first end and a second end, wherein:
   the hollow body portion receives the lock de-icer container therewithin at the first end,
   the hollow body portion receives the window de-icer container therewithin at the second end, wherein:
   the lock de-icer container includes means for dispensing de-icer and
   the second end has second apertures for receiving the second grippers of the second valve depresser;
   a cap member engaged to said first end; and
   a blade member having an outer periphery and a forward edge, with a scraper blade formed in said forward edge for scraping ice from a surface, said blade member mounted to said hollow body portion at a second end and having means for dispensing the de-icer through the blade member.

5. The ice scraper as in claim 4, further comprising:
   a first temperature controller;
   a second temperature controller;
   a switch;
   a power source;
   a first heating unit energized by the power source when activated by the switch, and abutting the lock de-icer container;
   a second heating unit energized by the power source when activated by the switch, and abutting the window de-icer container.

6. The ice scraper as in claim 5, wherein the power source is rechargeable.

7. The ice scraper as in claim 5, wherein the power source is a battery.

8. The ice scraper as in claim 5, further comprising:
   a transformer mounted in the hollow body portion; and
   at least one wire embedded in the hollow body portion, the blade member and scraper blade, wherein the transformer is operatively connected to said at least one wire, and said at least one wire being operable to generate heat upon energizing thereof by the switch and transformer for melting ice in contact with the blade member.

9. The ice scraper as claimed in claim 8, wherein the at least one wire in the blade member is operatively connected to the transformer by interconnecting a male connector to a female connector.

10. The ice scraper as in claim 5, wherein the blade member has passageways therethrough to channel de-icer from the window de-icer container.

11. The ice scraper as in claim 10, further comprising wires embedded on either side of the passageways.

12. The ice scraper as in claim 4, wherein the blade member is removable.

13. The ice scraper as in claim 4, wherein the blade member is secured to the elongated hollow body portion by press fit.

14. The ice scraper as in claim 4, wherein the blade member is further secured to the elongated hollow body portion by a securing clamp.

15. The ice scraper as in claim 4, wherein threads circumscribe the second end of said hollow body portion and the blade member has threads circumscribed thereon, which is threadably engaged to the threads circumscribing the second end of the body portion.

16. The ice scraper as in claim 4, wherein the blade member is further secured to the elongated hollow body by a securing clamp.

17. The ice scraper as in claim 5, wherein said hollow body portion is heated from heat transferred from the window de-icer container and/or the lock de-icer container.

18. The ice scraper as in claim 8, wherein said hollow body portion is heated from heat transferred from the window de-icer container and/or the lock de-icer container and the at least one wire.

19. The ice scraper as in claim 8, wherein said hollow body portion is heated from heat transferred from the window de-icer container and/or the lock de-icer container and/or the at least one wire embedded in the hollow body portion.

* * * * *